Dec. 10, 1968     W. FAUST     3,416,002
CURRENT CONVERTER CIRCUIT WITH CONTROLLED RECTIFIER ELEMENT
Filed Dec. 13, 1965
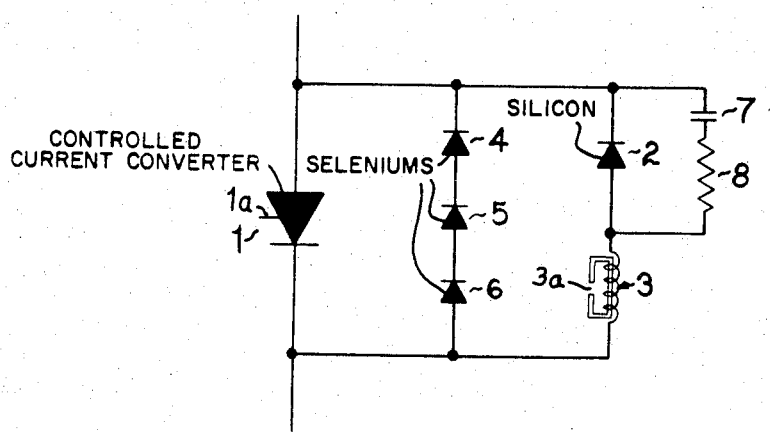
INVENTOR.
Werner Faust
BY
Pierce, Scheffler & Parker
attorneys

United States Patent Office 3,416,002
Patented Dec. 10, 1968

3,416,002
CURRENT CONVERTER CIRCUIT WITH
CONTROLLED RECTIFIER ELEMENT
Werner Faust, Wettingen, Aargau, Switzerland, assignor to Aktiengesellschaft Brown, Boveri & Cie., Baden, Switzerland, a joint-stock company
Filed Dec. 13, 1965, Ser. No. 513,269
Claims priority, application Switzerland, Dec. 31, 1964, 16,879/64
7 Claims. (Cl. 307—202)

ABSTRACT OF THE DISCLOSURE

A current converter circuit comprises a main current rectifying element of the controlled type and a series circuit arrangement of a silicon type semi-conductor diode and a saturable inductance coil is connected in inverse-parallel with the main rectifying element. A series circuit arrangement of a resistance and capacitance is connected in parallel with the silicon diode, and a selenium type diode is connected in inverse-parallel with the main rectifying element.

---

This invention relates to current converters having controlled rectifying elements and semi-conductor diodes connected in inverse-parallel arrangement with said elements.

For convenience controlled rectifying elements will be referred to hereinafter as valves.

In current converters which work on inductive loads, the current in the winding facing the load does not cease immediately when a valve is blocked, and accordingly the danger exists of excessive voltages on the supply side of the transformer. In order to avoid this, it has already been suggested to connect diodes in inverse-parallel arrangement, i.e. in back-to-front relation, to the controlled valves. By this means current can flow for a short time after the valve is blocked. This arrangement has the disadvantage, however, that undesirable voltage jumps occur at the end of the conductive period of the diodes. As such diodes, therefore, selenium rectifiers have been used, since these have good dielectric strength. Diodes of this type and for this purpose can only be manufactured for relatively small loads. In the case of large-capacity current converters, silicon rectifiers must be used, but these do not possess the necessary dielectric strength against voltage jumps.

On the other hand, with gas discharge valves the high voltage rise has the advantage that the anode space can be deionized more quickly, because of the higher voltage in the direction of blocking. In this connection the only condition to be observed is that the high voltage rise should not last too long, in order to keep what is called the "release time" as short as possible.

A simple inverse-parallel diode circuit does not fulfill this condition. In the case of large outputs, the voltage rise must not be too great, on account of the use of silicon diodes; in the case of smaller outputs, the high voltage remains for too long after the diodes have become currentless; consequently a current converter circuit capable of working at higher frequencies is not possible.

According to the present invention, which overcomes this disadvantage, a saturable inductance coil is connected in series with the inverse-parallel semi-conductor diode, and at least one selenium diode is connected in parallel with the series-connected combination of semi-conductor diode and inductance coil.

The foregoing objects and advantages inherent in the invention will become more apparent from the following detailed description of one practical embodiment thereof and from the accompanying drawings, the single figure of which is a schematic circuit diagram of the improved converter circuit.

With reference now to the drawing, the main converter valve is of the controlled type and is indicated at 1. The converter circuit including the valve and its control electrode 1a is assumed to be of known sort, and is therefore not shown. In parallel with i.e. connected across the anode and cathode of the valve 1 is a series circuit consisting of a silicon diode 2 arranged inverse-parallel with valve 1 and which is connected in series with an inductance coil 3. Selenium diodes 4, 5, 6 in series are connected inverse-parallel to the controlled valve 1. A resistance 8 and capacitance 7 arranged in series are connected across the diode 2. The inductance coil 3 consists of high-grade magnetic material and is saturated when current flows through the diode 2. The coil 3 may have a core with an air gap 3a, in order to give a low remanence point.

The silicon diode 2 has large current capacity, while the selenium diodes 4 to 6 have small current capacity.

The circuit shown operates as follows:

When the controlled valve 1 is blocked, and is therefore currentless, the current is first commutated to the series-connected selenium diodes 4 to 6. This takes place very quickly, since there is no inductance in the selenium diode circuit, and a relatively high voltage drop occurs, which can be predetermined by suitably choosing the number of diodes. In this way the deionization of the controlled valve is accelerated without the electrical stress on the valve becoming too high. The voltage across the selenium diodes furthermore brings about the saturation of the coil 3, so that its inductance practically disappears and the current can now be commutated into the circuit containing the silicon diode, where a small voltage drop occurs. The blocking voltage which appears immediately upon extinction of the controlled valve lies practically at the choke coil 3 since this coil is suddenly desaturated. Also, at the diode 2 the voltage then increases. The rise of this latter voltage is somewhat flattened due to the presence of the resistor-capacitor combination 7, 8. This voltage is known to result from the hole storage effect at the time of blocking of the diode. The sudden steep rise of this voltage is reduced by the parallel connection.

Since the invention leads to a short deionization time, it becomes possible to use current converters for higher frequencies than hitherto, it being ensured that commutation from one valve vessel to another takes place within the shortest possible time and without voltage peaks occurring.

I claim:

1. A current converter circuit comprising at least one main current rectifying element of the controlled type including an anode, a cathode and a control electrode, a semi-conductor diode connected in inverse-parallel arrangement with the cathode and anode of said main current-rectifying element and which includes a saturable inductance coil in series therewith, and at least one selenium diode in parallel connection with the series circuit arrangement of said semi-conductor diode and said inductance coil and which is also connected in inverse-parallel with the cathode and anode of said main current rectifying element.

2. A current converter circuit as defined in claim 1 wherein said semi-conductor diode is of the silicon type.

3. A current converter circuit as defined in claim 1 wherein said selenium diode has a load capacity smaller than that of said semi-conductor diode.

4. A current converter circuit as defined in claim 1 and which further includes a series combination of a resistance and a capacitor connected in parallel with said semi-conductor diode.

5. A current converter circuit as defined in claim 1 wherein said saturable inductance coil includes a core element having an air gap therein.

6. A current converter circuit as defined in claim 1 wherein said semi-conductor diode is of the silicon type and has a load capacity greater than that of said selenium diode, and which further includes a series combination of a resistance and capacitor connected in parallel with said semi-conductor diode.

7. A current converter circuit as defined in claim 6 and wherein said saturable inductance coil includes a core element having an air gap therein.

No references cited.

ARTHUR GAUSS, *Primary Examiner.*

J. ZAZWORSKY, *Assistant Examiner.*

U.S. Cl. X.R.

307—252, 305, 314; 317—39, 43; 315—340